United States Patent
Ko et al.

(10) Patent No.: US 10,901,541 B2
(45) Date of Patent: Jan. 26, 2021

(54) DISPLAY DEVICE

(71) Applicant: Samsung Display Co., Ltd., Yongin-si (KR)

(72) Inventors: Gwang-bum Ko, Seongnam-si (KR); Hyunjae Na, Seoul (KR); Cheolkyu Kim, Seoul (KR); Sangkyu Choi, Daejeon (KR); Jiwon Sohn, Seoul (KR); Soonsung Ahn, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 527 days.

(21) Appl. No.: 14/989,435

(22) Filed: Jan. 6, 2016

(65) Prior Publication Data
US 2016/0239133 A1 Aug. 18, 2016

(30) Foreign Application Priority Data
Feb. 16, 2015 (KR) ........................ 10-2015-0023580

(51) Int. Cl.
G06F 3/041 (2006.01)
G06F 1/16 (2006.01)
G06F 3/044 (2006.01)

(52) U.S. Cl.
CPC .......... *G06F 3/0412* (2013.01); *G06F 1/1643* (2013.01); *G06F 1/1652* (2013.01); *G06F 3/044* (2013.01); *G06F 2203/04112* (2013.01)

(58) Field of Classification Search
None
See application file for complete search history.

(56) References Cited

U.S. PATENT DOCUMENTS

| 8,508,680 B2 | 8/2013 | Geaghan et al. |
| 9,104,280 B2 | 8/2015 | Oh et al. |
| 9,207,818 B2 | 12/2015 | Kang et al. |
| 9,939,699 B2 * | 4/2018 | Park ................. G02F 1/133305 |
| 10,055,076 B2 | 8/2018 | Nakayama |

(Continued)

FOREIGN PATENT DOCUMENTS

| CN | 103559944 | 2/2014 |
| CN | 203930741 | 11/2014 |

(Continued)

OTHER PUBLICATIONS

Extended European Search Report dated Jul. 15, 2016, in European Patent Application No. 16155858.0.

(Continued)

*Primary Examiner* — Parul H Gupta
(74) *Attorney, Agent, or Firm* — H.C. Park & Associates, PLC

(57) ABSTRACT

A display device includes a display member and a touch member. The display member is configured to generate an image. The display member includes a folding area configured to be folded along a folding axis, and another area adjacent to the folding area. The touch member is configured to detect a touch interaction association with the display member. The touch member includes a touch sensor, and a signal line electrically connected to the touch sensor. The touch sensor is a mesh-shaped touch sensor. A mesh line of the mesh-shaped touch sensor crosses the folding axis. A minimum angle between the folding axis and the mesh line is less than 90 degrees.

20 Claims, 15 Drawing Sheets

(56) References Cited

U.S. PATENT DOCUMENTS

| | | | |
|---|---|---|---|
| 2011/0050631 A1 | 3/2011 | Kwon et al. | |
| 2011/0310037 A1* | 12/2011 | Moran | G06F 3/045 345/173 |
| 2012/0062510 A1 | 3/2012 | Mo et al. | |
| 2013/0021289 A1* | 1/2013 | Chen | G06F 1/1601 345/174 |
| 2013/0063370 A1 | 3/2013 | Lee et al. | |
| 2014/0060901 A1 | 3/2014 | Kim | |
| 2014/0062902 A1 | 3/2014 | Han et al. | |
| 2014/0069796 A1 | 3/2014 | Kang et al. | |
| 2014/0083751 A1 | 3/2014 | Oh et al. | |
| 2014/0101560 A1* | 4/2014 | Kwak | G06F 1/1652 715/738 |
| 2014/0132553 A1 | 5/2014 | Park et al. | |
| 2014/0145977 A1 | 5/2014 | Kang | |
| 2014/0267950 A1 | 9/2014 | Kang et al. | |
| 2015/0022732 A1* | 1/2015 | Park | G06F 3/044 349/12 |
| 2015/0160760 A1 | 6/2015 | Sato | |
| 2015/0220120 A1* | 8/2015 | Lee | G06F 3/045 345/173 |
| 2015/0261370 A1* | 9/2015 | Yoo | G06F 3/0412 345/173 |
| 2015/0376466 A1 | 12/2015 | Mitamura et al. | |
| 2016/0085269 A1* | 3/2016 | Yeh | G06F 3/041 345/173 |
| 2016/0282993 A1* | 9/2016 | Song | G06F 3/044 |
| 2016/0334896 A1* | 11/2016 | Koike | B32B 15/02 |
| 2017/0344162 A1* | 11/2017 | Lee | G06F 3/0412 |
| 2019/0179445 A1* | 6/2019 | Moon | G06F 3/0416 |
| 2020/0272012 A1* | 8/2020 | Yoshida | G02F 1/136286 |

FOREIGN PATENT DOCUMENTS

| | | |
|---|---|---|
| JP | 2014-056461 | 3/2014 |
| JP | 3195853 | 2/2015 |
| KR | 10-1073684 | 10/2011 |
| KR | 10-2011-0127236 | 11/2011 |
| KR | 10-1167007 | 7/2012 |
| KR | 10-2013-0027747 | 3/2013 |
| KR | 10-2014-0021948 | 2/2014 |
| KR | 10-2014-0030773 | 3/2014 |
| KR | 10-2014-0038819 | 3/2014 |
| KR | 10-2014-0062269 | 5/2014 |
| KR | 10-2014-0064259 | 5/2014 |
| KR | 10-1397200 | 5/2014 |
| KR | 10-2014-0066441 | 6/2014 |
| KR | 10-2014-0084880 | 7/2014 |
| TW | M493107 | 1/2015 |
| WO | 2014/142054 | 9/2014 |
| WO | 2015/174126 | 11/2015 |

OTHER PUBLICATIONS

Office Action dated Dec. 30, 2019, in Chinese Patent Application No. 201610082032.X.

Examination Report dated Dec. 18, 2019, in European Patent Application No. 16155858.0.

Office Action dated Feb. 25, 2020, in Japanese Patent Application No. 2016-023451.

* cited by examiner

DISPLAY DEVICE

CROSS-REFERENCE TO RELATED APPLICATION

This application claims priority from and the benefit of Korean Patent Application No. 10-2015-0023580, filed on Feb. 16, 2015, which is incorporated by reference for all purposes as if fully set forth herein.

BACKGROUND

1. Field

Exemplary embodiments relate to a display device. More particularly, exemplary embodiments relate to a foldable display device.

2. Discussion

A display device displays various images on a display screen to provide a user with information. Foldable display devices including flexible display members have also been developed. Additionally, these display devices may include a touch member, which may be folded to correspond to the flexible display member. The touch member may determine coordinate information of a position at which a touch event occurs, as well as provide information to the display member. The display member may be connected to the touch member and display an image corresponding to the information provided by the touch member. It is noted, however, that a foldable display device may be folded, rolled, twisted, etc., whereas a flat panel display device is not designed to withstand such manipulation. To this end, a foldable display device, which may be deformed in various shapes, may be more portable and more user friendly than a typical flat panel display device.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a display device including a touch member with improved reliability.

Additional aspects will be set forth in the detailed description which follows, and, in part, will be apparent from the disclosure, or may be learned by practice of the inventive concept.

According to one or more exemplary embodiments, a display device includes a display member and a touch member. The display member is configured to generate an image. The display member includes a folding area configured to be folded along a folding axis, and another area adjacent to the folding area. The touch member is configured to detect a touch interaction association with the display member. The touch member includes a touch sensor, and a signal line electrically connected to the touch sensor. The touch sensor is a mesh-shaped touch sensor. A mesh line of the mesh-shaped touch sensor crosses the folding axis. A minimum angle between the folding axis and the mesh line is less than 90 degrees.

According to one or more exemplary embodiments, when the touch member is folded along the folding axis, stress applied to the mesh line overlapping the folding area is reduced at least because the mesh line is not perpendicular to the folding axis. As such, damage associated with bending stress applied to the mesh line is prevented or at least reduced. To this end, reliability of the touch member is improved.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1A:
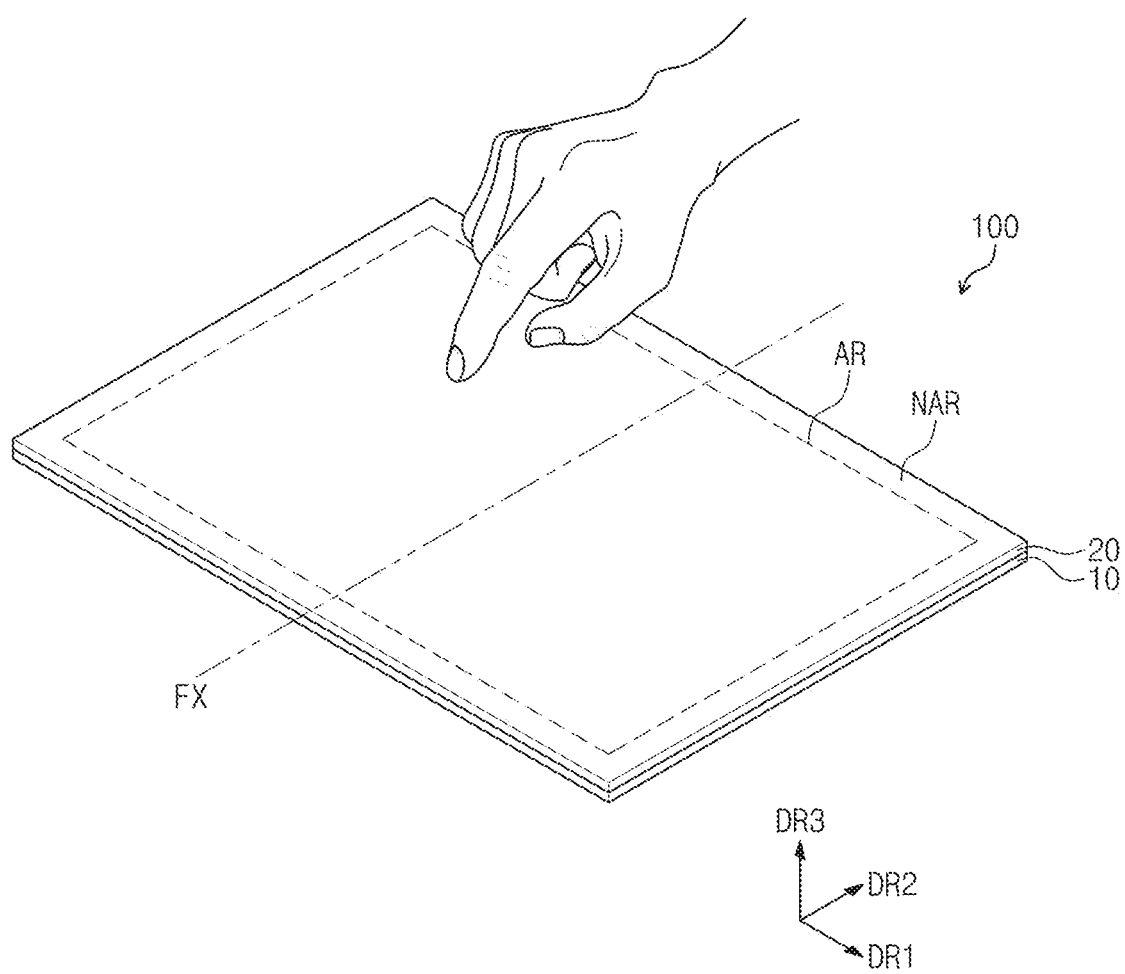
FIGS. 1A, 1B, and 1C are perspective views of a display device, according to one or more exemplary embodiments.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms "first," "second," etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1B:
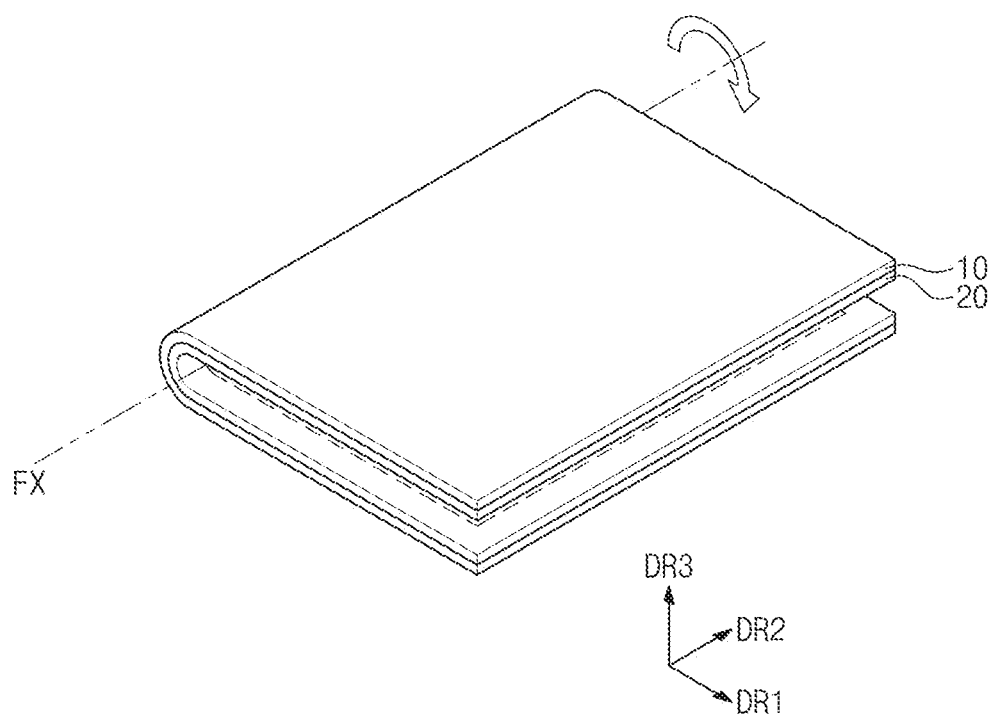
Figure 1C:
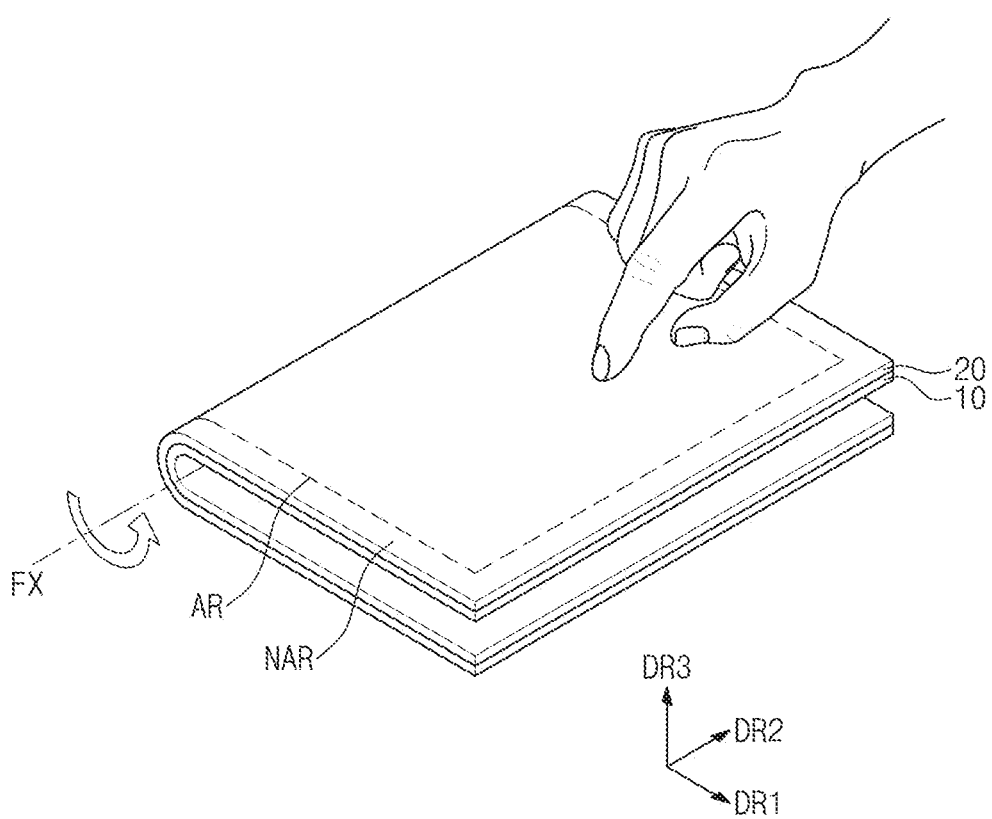
Figure 2:
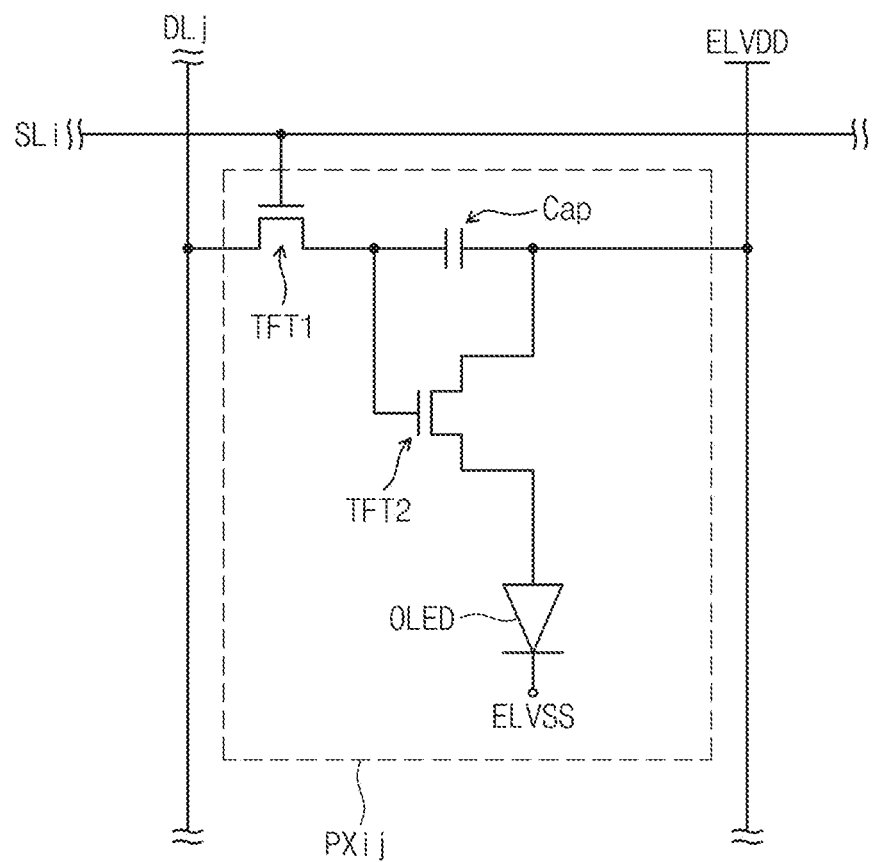
FIG. 2 is an equivalent circuit diagram of a pixel of a display member, according to one or more exemplary embodiments.

FIGS. 1A, 1B, and 1C are perspective views of a display device, according to one or more exemplary embodiments. FIG. 1A is a perspective view of display device 100 in an unfolded state, FIG. 1B is a perspective view of display device 100 in a first folded state, e.g., an "inwardly" folded state, and FIG. 1C is a perspective view of display device 100 in a second folded state, e.g., an "outwardly" folded state. FIG. 2 is an equivalent circuit diagram of a pixel of a display member, according to one or more exemplary embodiments.

As seen in FIGS. 1A to 1C, the display device 100 includes a display member 10 and a touch member 20. The display device 100 includes an active region AR and a non-active region NAR. In an unfolded state, the active region AR and the non-active region NAR may be disposed in a plane defined by a first direction DR1 and a second direction DR2. The active region AR is a region in which the touch member 20 may be activated, e.g., a region in which touch interactions (near and/or close touches) may be detected. The active region AR may also correspond to a display region (not shown) in which the display member 10 may be activated, e.g., a region in which images may be displayed. As such, the active region AR and the display region may overlap one another. In this manner, a user may input a touch signal to the display device and simultaneously (or substantially simultaneously) perceive information from an image displayed via the display region. The non-active region NAR is disposed outside the active region AR, and, to this end, may be a region in which the touch member 20 is inactivated. For example, the non-active region NAR may include lines to transmit electrical signals that activate and/or deactivate the active region AR.

The display member 10 may display images. Although not illustrated, the display member 10 may include a plurality of data lines, a plurality of scan lines, and a plurality of pixels connected to corresponding data lines and corresponding scan lines. The pixels may be arranged in any suitable formation (e.g., a matrix formation) when viewed in a plan view. A pixel may be turned on or turned off in response to a scan signal provided via a corresponding scan line. The pixel may also generate light (e.g., display an image) corresponding to a data signal provided via a corresponding data line. An exemplary pixel structure will be described in more detail in association with FIG. 2.

FIG. 2 is an equivalent circuit diagram of a representative pixel PXij connected to an i-th scan line SLi and a j-th data line Dj among pixels of display device 100. In this manner, other pixels of display device 100 may have the same equivalent circuit diagram as the pixel PXij. As such, duplicative descriptions have been omitted to avoid obscuring exemplary embodiments described herein.

Referring to FIG. 2, the pixel PXij may include at least one thin film transistor, at least one capacitor, and at least one light emitting element. For example, the pixel PXij includes a first thin film transistor TFT1, a second thin film transistor TFT2, a capacitor Cap, and an organic light emitting diode OLED.

The first thin film transistor TFT1 includes a control electrode connected to the i-th scan line SLi, a first (e.g., input) electrode connected to the j-th data line DLj, and a second (e.g., output) electrode connect to a first capacitor electrode of the capacitor Cap. In this manner, the first thin film transistor TFT1 may output a data signal provided via the j-th data line DLj in response to a scan signal provided via the i-th scan line SLi. The capacitor Cap includes a first capacitor electrode connected to the second electrode of the first thin film transistor TFT1 and a second capacitor electrode configured to receive a first source voltage ELVDD. The capacitor Cap may be charged according to a difference in voltage between a voltage output via the first thin film transistor TFT1 and the first source voltage ELVDD.

The second thin film transistor TFT2 includes a control electrode connected between the second electrode of the first thin film transistor TFT1 and the first capacitor electrode of the capacitor Cap, a first (e.g., input) electrode configured to receive the first source voltage ELVDD, and a third (e.g., output) electrode. The third electrode of the second thin film transistor TFT2 is connected to the organic light emitting diode OLED. In this manner, the second thin film transistor TFT2 may control a driving current through the organic light emitting diode OLED in response to an amount of electric charge charged stored via the capacitor Cap. A turn-on time period of the second thin film transistor TFT2 may be determined according to the amount of electric charge stored via the capacitor Cap. The third electrode of the second thin film transistor TFT2 may apply a voltage having a lower voltage level than the voltage level of the first source voltage ELVDD to the organic light emitting diode OLED.

The organic light emitting diode OLED includes a first electrode connected to the third electrode of the second thin film transistor TFT2 and a second electrode configured to receive a second source voltage ELVSS. Although not illustrated, the organic light emitting diode OLED may include a light emitting pattern disposed between the first electrode and the second electrode. In this manner, the organic light emitting diode OLED may emit light during the turn-on time period of the second thin film transistor TFT2. Light emitted from the organic light emitting diode OLED may have a color determined according to a material of the light emitting pattern. For instance, the color of the light emitted from the organic light emitting diode OLED may be a red, green, blue, or white color. It is contemplated, however, that the organic light emitting diode OLED may be configured to emit any suitable color of light. To this end, it is also contemplated that the light emitting diode OLED may be configured to emit different colors based on different applied voltage/current. In other words, the light emitting diode may be "color tunable" via, for instance, different electroluminescent molecules, one or more stacks of different light-emitting layers of different emissive colors, etc.

Adverting back to FIGS. 1A to 1C, the display member 10 may be flexed, e.g., bent, rolled, folded, twisted, etc., which will be collectively referred to herein as "folded." As such, the display member 10 may be folded in various directions with respect to, for example, a folding axis FX. For instance, as shown in FIG. 1B, a portion of the display member 10 is folded along the folding axis FX and disposed above another portion of the display member 10 in a third direction DR3. The folded state in FIG. 1B may be referred to as an "inwardly" folded state, as a first surface of display device 100 may be folded upon itself, such that opposing portions of the first surface face one another. As another example, as shown in FIG. 1C, a portion of the display member 10 is folded along the folding axis FX and disposed under the other portion of the display member 10 in the third direction DR3. The folded state in FIG. 1C may be referred to as an "outwardly" folded state, as the first surface of the display device 100 may be folded upon itself, such that opposing portions of the first surface face away from one another. Although not shown, it is also contemplated that the display member 10 may be folded along two or more folding axes.

According to one or more exemplary embodiments, the touch member 20 is disposed on the display member 10. The touch member 20 may sense (or otherwise detect) a touch interaction (e.g., actual touch, near touch, multiple touches, etc.) associated with the display member 10. In this manner, a touch signal may be generated in association with touch electrodes (not shown) of the touch member 20. As seen in FIG. 1, the touch member 20 is disposed above the display member 10 to sense a touch signal input to an upper portion of the display member 10. It is also contemplated that the touch member 20 may be disposed under, inside, or part of the display member 10. Further, the touch member 20 may be disposed at various positions to sense a touch signal input to the display member 10. In this manner, the touch member 20 may have various structures, such as an electrostatic capacitive type touch panel, a resistive layer type touch panel, an electromagnetic induction type touch panel, etc.

The touch signal may be input to the display member 10 using various methods. FIGS. 1A to 1C show the touch member 20 sensing the touch signal input via a part of a human body, e.g., a finger; however, the touch input may be input via any suitable manner, e.g., via a stylus, etc. It is also contemplated that the touch signal may be input using an optical type input manner, a touch type input manner, a magnetic type input manner, etc.

As previously mentioned, the touch member 20 may be flexed. As such, at least a portion of the touch member 20 may be folded along the folding axis FX to achieve an "inward" or "outward" folded state along the folding axis FX, as shown in FIGS. 1B and 1C. For instance, FIGS. 1B and 1C show the display device 100 in which at least a portion of the display device 100 is rotated at an angle of about 180 degrees with respect to the folding axis FX. It is contemplated, however, that any suitable folding angle may be achieved, whether less than or greater than 180 degrees with respect to folding axis FX. Further, the folded state of the display device 100 may include a bending state in which the display device 100 is rotated at a predetermined angle with respect to the folding axis FX.

Referring to FIG. 1B, the display device 100 may be deformed in the inwardly folded state. In this manner, the touch member 20 is disposed "inside" the display device 100, and, as such, the touch member 20 may be protected from external impacts. Referring to FIG. 1C, the display device 100 may be deformed in the outwardly folded state. In this manner, the touch member 20 is disposed "outside" the display device 100, and, as such, the display device 100 may sense an external touch when in the outwardly folded state.

Figure 3A:
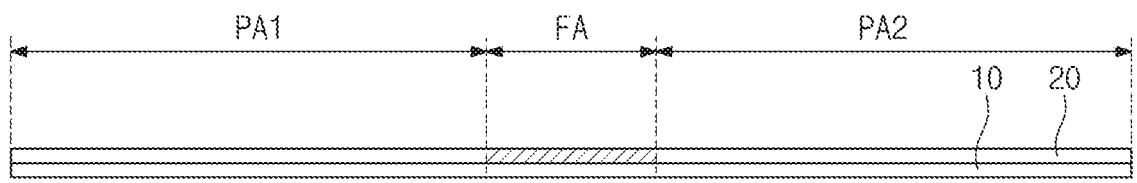
FIGS. 3A, 3B, and 3C are side views of a display device, according to one or more exemplary embodiments.
Figure 3A:
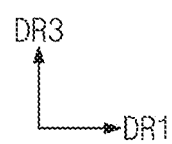
Figure 3B:
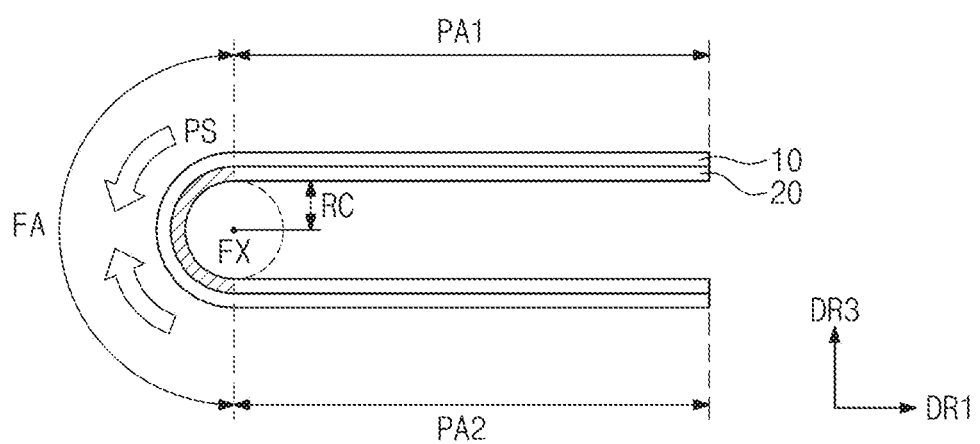
Figure 3C:
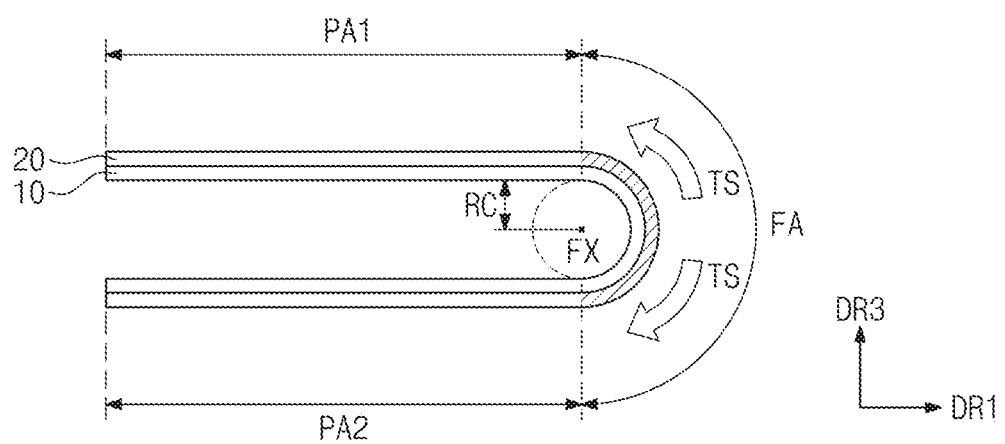

FIGS. 3A, 3B, and 3C are side views of a display device, according to one or more exemplary embodiments. FIG. 3A is a first side view of the display device in an unfolded state, according to one or more exemplary embodiments. FIGS. 3B and 3C are respective second and third side views of the display device in folded states, according to one or more exemplary embodiments. That is, the first side view shows the display device 100 in the unfolded state, the second side view shows the display device 100 in the inwardly folded state, and the third side view shows the display device 100 in the outwardly folded state.

Hereinafter, variations in the display device 100 according to the folding of the display device 100 will be described with reference to FIGS. 3A to 3C. To avoid obscuring exemplary embodiments described herein, duplicative descriptions are omitted.

The display member 10 includes a folding area FA and at least one area disposed adjacent to the folding area, such as a plane area. For example, the display member 10 includes a first plane area PA1, the folding area FA, and a second plane area PA2 that are sequentially arranged in the first direction DR1. The folding area FA overlaps the folding axis FX, or, in other words, the folding axis FX is disposed in the folding area FA. A stress occurs in the folding area FA when the display member 10 is folded. To this end, the folding area FA is easily deformed due to the stress, and, as such, the shape of the folding area FA when the display member 10 is in the unfolding state is different from the shape of the folding area FA when the display member 10 is in a folded state.

The stress caused, at least in part, by the folding of the display member 10 may not occur in the first plane area PA1 and second plane area PA2. As such, the shape of the first and second plane areas PA1 and PA2, when the display device 100 is in the unfolded state, may be substantially the same as the shape of the first plane area PA1 and the second plane area PA2 when the display device 100 is in a folded state. In an exemplary embodiment, the first plane area PA1 and the second plane area PA2 may be relatively more rigid than the folding area FA.

As seen in FIGS. 3A to 3C, a portion of the touch member 20 corresponding to the folding area FA is hatched with oblique lines for illustrative convenience. Given that the touch member 20 is folded in correspondence with the display member 10, a portion of the touch member 20 that overlaps the folding area FA may be easily deformed due to the folding stress.

As shown in FIG. 3B, the display device 100 is folded along the folding axis FX in the inwardly folded state. In this manner, the touch member 20 is disposed at an inner side of the display member 10 and is more adjacent to the folding axis FX than the display member 10. As such, at least a compressive stress PS is applied to the folding area FA of the display device 100 in the inwardly folded state. The portion of the touch member 20 that overlaps the folding area FA is applied with the compressive stress PS. To this end, the portion of the touch member 20 that overlaps the folding area FA may undergo shrinkage deformation due to the compressive stress PS. Further, the display device 100 may be folded at a predetermined radius of curvature RC. As a distance from the folding axis FX decreases, the compressive stress PS applied to the display member 10 or the touch member 20 increases. In this manner, the touch member 20 may be applied with a greater compressive stress than the display member 10 when the display device 100 is in the inwardly folding state because the touch member 20 is folded "inside" the display member 10.

As shown in FIG. 3C, the display device 100 may be folded along the folding axis FX to be in the outwardly folded state. In this manner, the touch member 20 is disposed at an outer side of the display member 10 and is disposed further from the folding axis than the display member 10. At least a tensile stress TS is applied to the folding area FA of the display device 100 in the outwardly folded state. The portion of the touch member 20 that overlaps the folding area FA is applied with the tensile stress TS. To this end, the portion of the touch member 20 that overlaps the folding area FA may undergo expansive deformation due to the tensile stress TS. Further, when the display device 100 is outwardly folded at the same radius of curvature RC as the inwardly folded state, the tensile stress TS applied to the touch member 20 increases as a distance from the folding axis FX increases. Thus, the touch member 20 may be applied with a greater tensile stress than the display member 10 when the folding area FA is in the outwardly folded state.

Referring to FIGS. 3A to 3C, when the folding area FA is in the outwardly folded state, the portion of the touch member 20 that overlaps the folding area FA is deformed more than the portion of the touch member 20 when the folding area FA is in the inwardly folded state. As viewed relative to the same radius of curvature, a circumference of a circle becomes larger as a distance from a center of the circle increases. As such, the touch member 20 is farthest from the folding axis FX when the folding area FA is in the outwardly folded state, and the stress applied to the touch member 20 overlapping the folding area FA in the outwardly folded state is larger than the stress applied to the touch member 20 overlapping the folding area FA in the inwardly folded state. In this manner, the portion of the touch member 20 overlapping the folding area FA may experience more deformation when the tensile stress TS is applied to the portion of the touch member 20 than that when the compressive stress PS is applied to the portion of the touch member 20. This is described in detail in the proceeding paragraphs.

Figure 4:
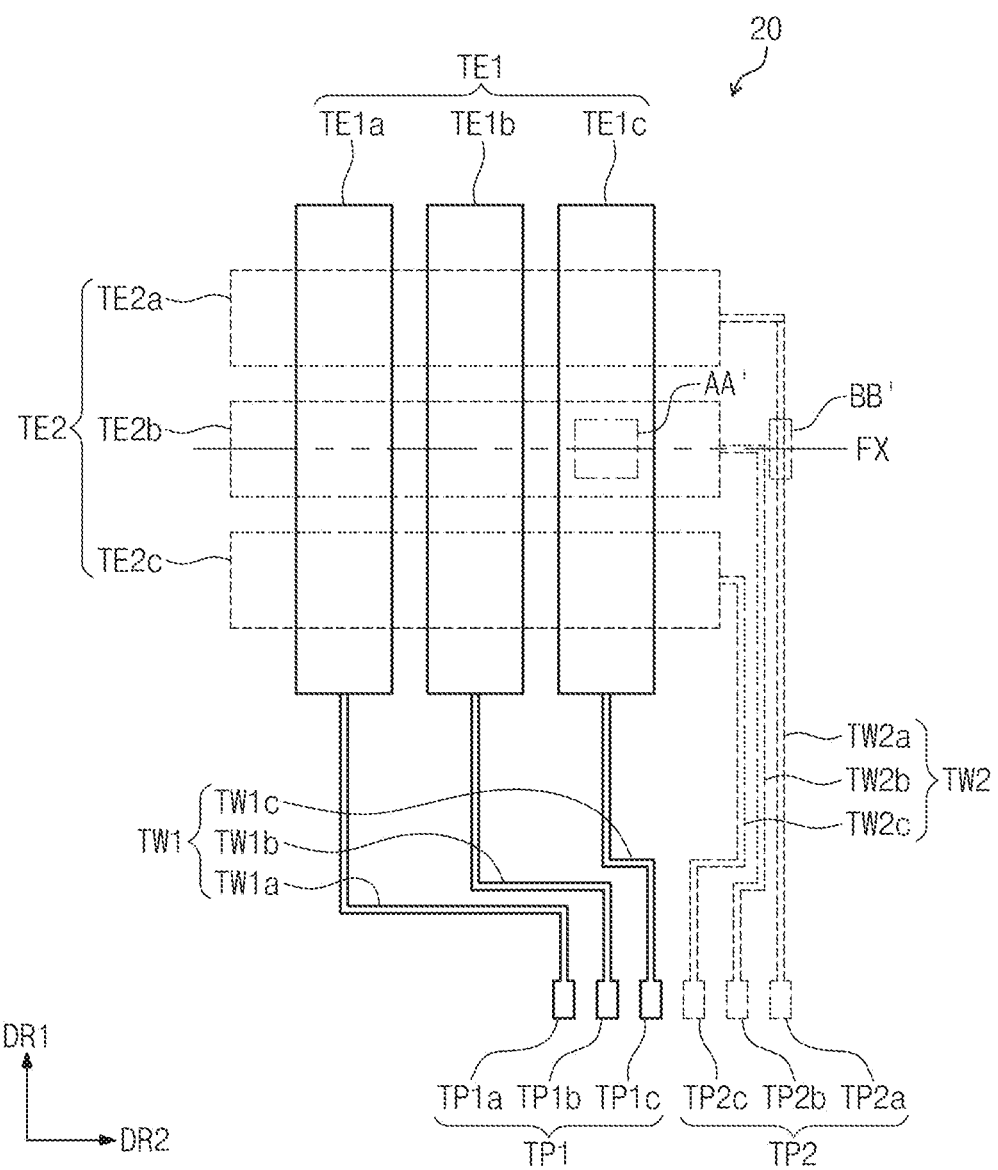
FIG. 4 is a plan view of a touch member, according to one or more exemplary embodiments.
Figure 5A:
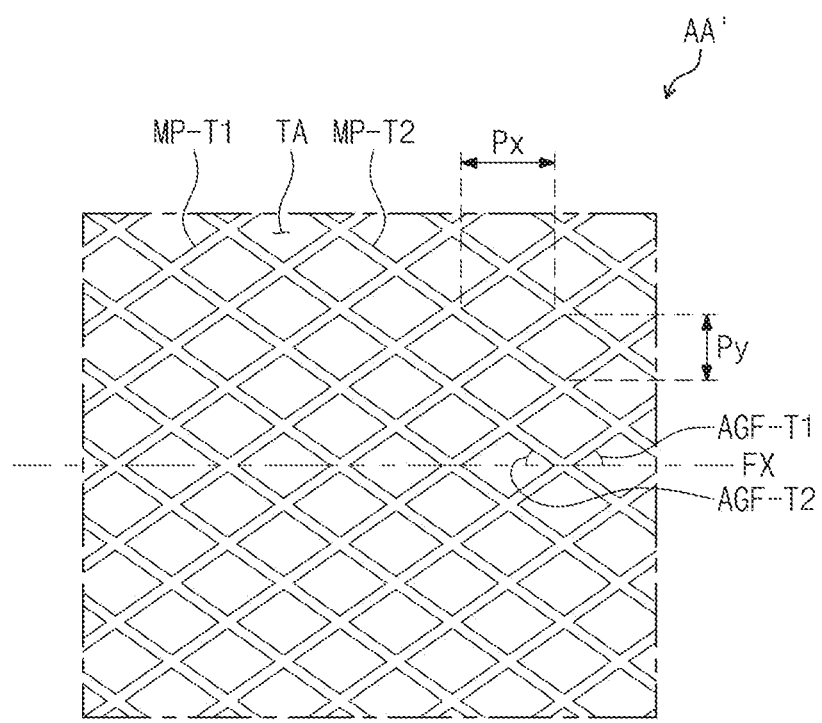
FIG. 5A is an enlarged plan view of portion AA' in FIG. 4, according to one or more exemplary embodiments.
Figure 5B:
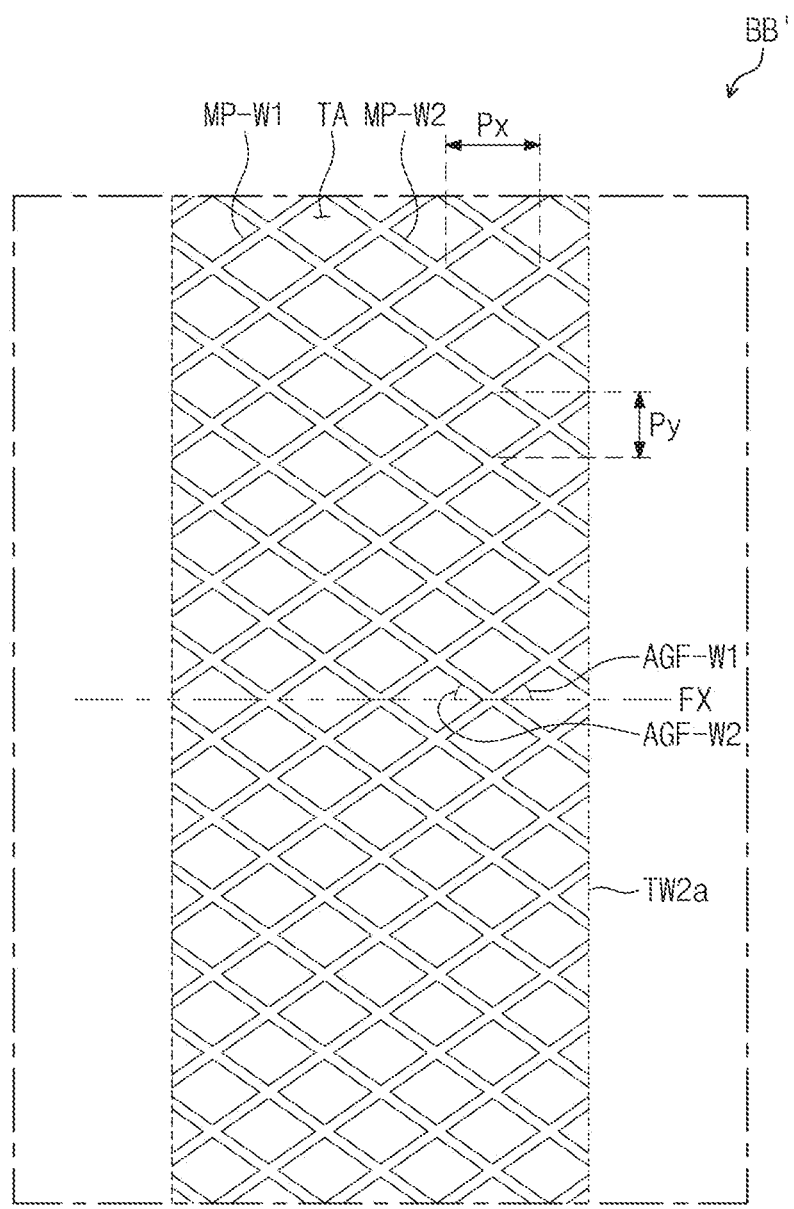
FIG. 5B is an enlarged plan view of portion BB' of FIG. 4, according to one or more exemplary embodiments.

The touch member 20 is described in more detail in association with FIGS. 4, 5A, and 5B. FIG. 4 is a plan view of a touch member, according to one or more exemplary embodiments. FIG. 5A is an enlarged plan view of portion AA' of FIG. 4, whereas FIG. 5B is an enlarged plan view of portion BB' of FIG. 4.

The touch member 20 includes a touch sensor and a signal line. The touch sensor includes a first electrode TE1 and a second electrode TE2. The signal line includes a first line TW1 and a second line TW2. The first electrode TE1 and the second electrode TE2 are spaced apart from each other in the third direction DR3 extending into and out of the page to allow an insulating layer to be disposed between the first electrode TE1 and the second electrode TE2. For illustrative convenience, the insulating layer is omitted from FIG. 4, and the second electrode TE2 is indicated by a dotted line because the second electrode TE2 is disposed on a different layer than the first electrode TE1. It is noted, however, that the insulating layer enables the first electrode TE1 to be insulated from the second electrode TE2.

According to one or more exemplary embodiments, the first electrode TE1 is disposed on the insulating layer. The first electrode TE1 includes a plurality of first touch electrodes TE1a, TE1b, and TE1c. The first touch electrodes TE1a, TE1b, and TE1c extend in the first direction DR1 and are arranged in a second direction DR2 crossing the first direction DR1. That is, the first touch electrodes TE1a, TE1b, and TE1c are spaced apart from each other in the second direction DR2. Further, the second electrode TE2 is disposed under the insulating layer. The second electrode TE2 includes a plurality of second touch electrodes TE2a, TE2b, and TE2c. The second touch electrodes TE2a, TE2b, and TE2c extend in the second direction DR2 and are arranged in the first direction DR1; that is, the second touch electrodes TE2a, TE2b, and TE2c are spaced apart from each other in the second direction DR2.

Furthermore, the folding axis FX is defined substantially parallel to the second direction DR2. Accordingly, each of the first touch electrodes TE1a, TE1b, and TE1c is substantially perpendicular to the folding axis FX.

FIG. 5A shows a portion of a first touch electrode TE1c among the first touch electrodes TE1a, TE1b, and TE1c. As shown in FIG. 5A, the first touch electrode TE1c includes a plurality of mesh lines defining a mesh shape. The second touch electrodes TE2a, TE2b, and TE2c and the other first touch electrodes TE1a and TE1b may have substantially the same shape as the first touch electrode TE1c. As such, duplicative descriptions have been omitted to avoid obscuring exemplary embodiments described herein.

The mesh lines include a plurality of first mesh lines MP-T1 extending in one direction and a plurality of second mesh lines MP-T2 extending in another direction crossing the first mesh lines MP-T1. At least one of the directions in which the first mesh lines MP-T1 and the second mesh lines MP-T2 extend is different from the direction which the folding axis extends in.

Each of the first mesh lines MP-T1 and the second mesh lines MP-T2 has a width, i.e., a line width, measured in terms of micrometers. For instance, each of the first mesh lines MP-T1 and the second mesh lines MP-T2 has the width of about 3000 micrometers or less. For instance, each of the first mesh lines MP-T1 and the second mesh lines MP-T2 has a width in a range greater than or equal to about 10 micrometers and less than or equal to about 3000 micrometers, e.g., greater than or equal to about 100 micrometers and less than or equal to about 2900 micrometers, for instance, greater than or equal to about 500 micrometers and less than or equal to about 2500 micrometers, such as greater than or equal to about 1000 micrometers and less than or equal to about 2000 micrometers. Given that the first mesh lines MP-T1 and the second mesh lines MP-T2 included in the first touch electrode TE1c are micrometers in width, the patterns are not perceptible by (or substantially unperceivable to) the user. As such, although the display area may overlap the active region AR of the touch member 20, influences caused by the touch sensor and exerted on visibility of an image displayed in the display area may be reduced.

Among angles between the folding axis FX and the first mesh lines MP-T1, a first minimum angle AGF-T1 is less than 90 degrees. In addition, among angles between the folding axis FX and the second mesh lines MP-T2, a second minimum angle AGF-T2 is less than 90 degrees. Since the touch member 20 is folded along the folding axis FX, those mesh lines overlapping the folding area FA (not shown) among the first mesh lines MP-T1 and the second mesh lines MP-T2 are applied with stress caused by the folding of the folding area. The stress caused by the folding of the folding area FA is strongest in a direction vertical (or substantially vertical) to the folding axis FX, e.g., orthogonal to the folding axis FX.

When the first mesh lines MP-T1 and the second mesh lines MP-T2 have a relatively "fine" width and thickness to improve visibility of an image in the display area, the first mesh lines MP-T1 and the second mesh lines MP-T2 may be easily damaged by the stress caused by the folding action. According to one or more exemplary embodiments, the first mesh lines MP-T1 and the second mesh lines MP-T2 are disposed to form an angle less than 90 degrees with respect to the folding axis FX. As the angle between the folding axis FX and the first mesh lines MP-T1 and the second mesh lines MP-T2 approach zero (0), the stress applied to the first mesh lines MP-T1 and the second mesh lines MP-T2 decreases. As such, the configuration of the touch member 20 according to one or more exemplary embodiments may prevent (or at least reduce) stress and damage of the first touch electrode TE1c caused, at least in part, by the folding of the display device 100.

As seen in FIG. 5A, the first mesh lines MP-T1 and the second mesh lines MP-T2 cross each other to define a plurality of transmission areas TA having various shapes. The transmission areas TA may have the same shape as each other or at least some may have different shapes from each other. Each transmission area TA may have a circular shape, an oval shape, a polygonal shape, etc. In various exemplary embodiments, each of the transmission areas TA has a polygonal shape. The first mesh lines MP-T1 cross the second mesh lines MP-T2 in various alignment distances and various cross angles. The shape of each of the transmission areas TA may be varied depending on the alignment distance of the first mesh lines MP-T1, the alignment distance of the second mesh lines MP-T2, and the cross angle between the first mesh lines MP-T1 and the second mesh lines MP-T2.

Each of the transmission areas TA defined by the first mesh lines MP-T1 crossing the second mesh lines MP-T2 may have a lozenge shape. The first mesh lines MP-T1 and the second mesh lines MP-T2 are arranged at regular intervals. Lozenge shape of each of the transmission areas TA includes a first diagonal line Px and a second diagonal line Py. The first diagonal line Px extends in a direction substantially parallel to the folding axis FX. The second diagonal line Py crosses the first diagonal line Px. Since each of the transmission areas TA may have a lozenge shape, the second diagonal line Py may be substantially perpendicular to the first diagonal line Px, or, in other words, the second diagonal line Py may be vertical (or substantially vertical) to the folding axis FX.

The first diagonal line Px may have a length longer than a length of the second diagonal line Py. As such, the first minimum angle AGF-T1 between the folding axis FX and the first mesh lines MP-T1 and the second minimum angle AGF-T2 between the folding axis FX and the second mesh lines MP-T2 may be in a range greater than or equal to about 0 degrees and less than or equal to about 45 degrees. As seen in FIG. 5A, each of the transmission areas TA has the lozenge shape elongated in a direction, e.g., a horizontal direction, substantially parallel to the folding axis FX. Further, the touch member 20 has the mesh shape defining the transmission areas TA each in which a length in the horizontal direction is longer than a length in a vertical direction, and, as such, the conductive portion, e.g., the first mesh lines MP-T1 and the second mesh lines MP-T2, may be prevented (or at least reduced) from being damaged by the folding action along the folding axis FX.

Adverting back to FIG. 4, the first line TW1 may be disposed on the same layer as the first electrode TE1. The first line TW1 is provided in a plural number, e.g., first lines TW1a, TW1b, and TW1c. The first lines TW1a, TW1b, and TW1c are connected to the first touch electrodes TE1a, TE1b, and TE1c, respectively. Further, the second line TW2 is disposed on the same layer as the second electrode TE2. The second line TW2 is provided in a plural number, e.g., second lines TW2a, TW2b, and TW2c. The second lines TW2a, TW2b, and TW2c are connected to the second touch electrodes TE2a, TE2b, and TE2c.

FIG. 5B shows a portion of a second line TW2a among the second lines TW2a, TW2b, and TW2c. As shown in FIG. 5B, the second line TW2a includes a plurality of conductive lines, e.g., mesh lines defining a mesh shape. The first lines TW1a, TW1b, and TW1c and the other second lines TW2b and TW2c may have substantially the same shape as the second line TW2a. As such, duplicative descriptions have been omitted to avoid obscuring exemplary embodiments described herein.

The conductive lines include a plurality of first conductive lines MP-W1 and a plurality of second conductive lines MP-W2. The first conductive lines MP-W1 cross the second conductive lines MP-W2. As seen in FIG. 5B, the first conductive lines MP-W1 and the second conductive lines MP-W2 are arranged at regular intervals. To this end, a first minimum angle AGF-W1 between the folding axis FX and the first conductive lines MP-W1 and a second minimum angle AGF-W2 between the folding axis FX and the second conductive lines MP-W2 is less than 90 degrees. In this manner, although the second line TW2a extends in a direction substantially perpendicular to the folding axis FX, stress caused by the folding action and applied to the second line TW2a may be reduced at least because the first conductive lines MP-W1 and the second conductive lines MP-W2 of the second line TW2a cross the folding axis FX at an angle less than 90 degrees.

According to one or more exemplary embodiments, the first conductive lines MP-W1 and the second conductive lines MP-W2 may be arranged in the same shape as the first mesh lines MP-T1 and the second mesh lines MP-T2. The first conductive lines MP-W1 correspond to the first mesh lines MP-T1 and the second conductive lines MP-W2 correspond to the second mesh lines MP-T2. In this manner, a plurality of transmission areas TA defined by the intersection of the first conductive lines MP-W1 and the second conductive lines MP-W2 includes a first diagonal line Px and a second diagonal line Py. The first diagonal line Px may be longer than the second diagonal line Py. The length of the first diagonal line Px and/or the second diagonal line Py may be determined to prevent (or at least reduce) the potential damage of the touch member 20 due to the folding action along folding axis FX, as well as prevent (or at least reduce) a touch sensitivity of the touch member 20. For instance, the length of the first diagonal line Px may be in a range equal to or greater than about 50 micrometers and less than or equal to about 500 micrometers.

Although not shown, the second line TW2 may be disposed in an area outside (e.g., not overlapping) the folding axis FX. When the first lines TW1 and the second lines TW2 do not overlap the folding axis FX, influences caused by the folding stress and applied to the signal lines may be prevented (or at least reduced).

Adverting back to FIG. 4, the touch member 20 may further include a pad. The touch sensor receives an electrical signal (e.g., external electrical signal) from a source (e.g., an external source) (not shown) or provides the electrical signal to the external source through the pad. The pad includes a first pad TP1 and a second pad TP2. Each of the first pad TP1 and the second pad TP2 may be provided in a plural number. For instance, the first pad TP1 includes first pads TP1a, TP1b, and TP1c respectively corresponding to the first lines TW1a, TW1b, and TW1c, and the second pad TP1 includes second pads TP2a, TP2b, and TP2c respectively corresponding to the second lines TW2a, TW2b, and TW2c. The second pads TP2a, TP2b, and TP2c may be disposed on a different layer from the first pads TP1a, TP1b, and TP1c. It is contemplated, however, that the second pads TP2a, TP2b, and TP2c may be disposed on the same layer as the first pads TP1a, TP1b, and TP1c. Further, the second pads TP2a, TP2b, and TP2c may be electrically connected to the second lines TW2a, TW2b, and TW2c disposed on a different layer through separate contact holes. In this manner, the touch sensor may be electrically connected to the external source after passing through a layer, and, as such, the touch sensor may be relatively easy to assemble with (or otherwise connect to) the external source.

Figure 6A:
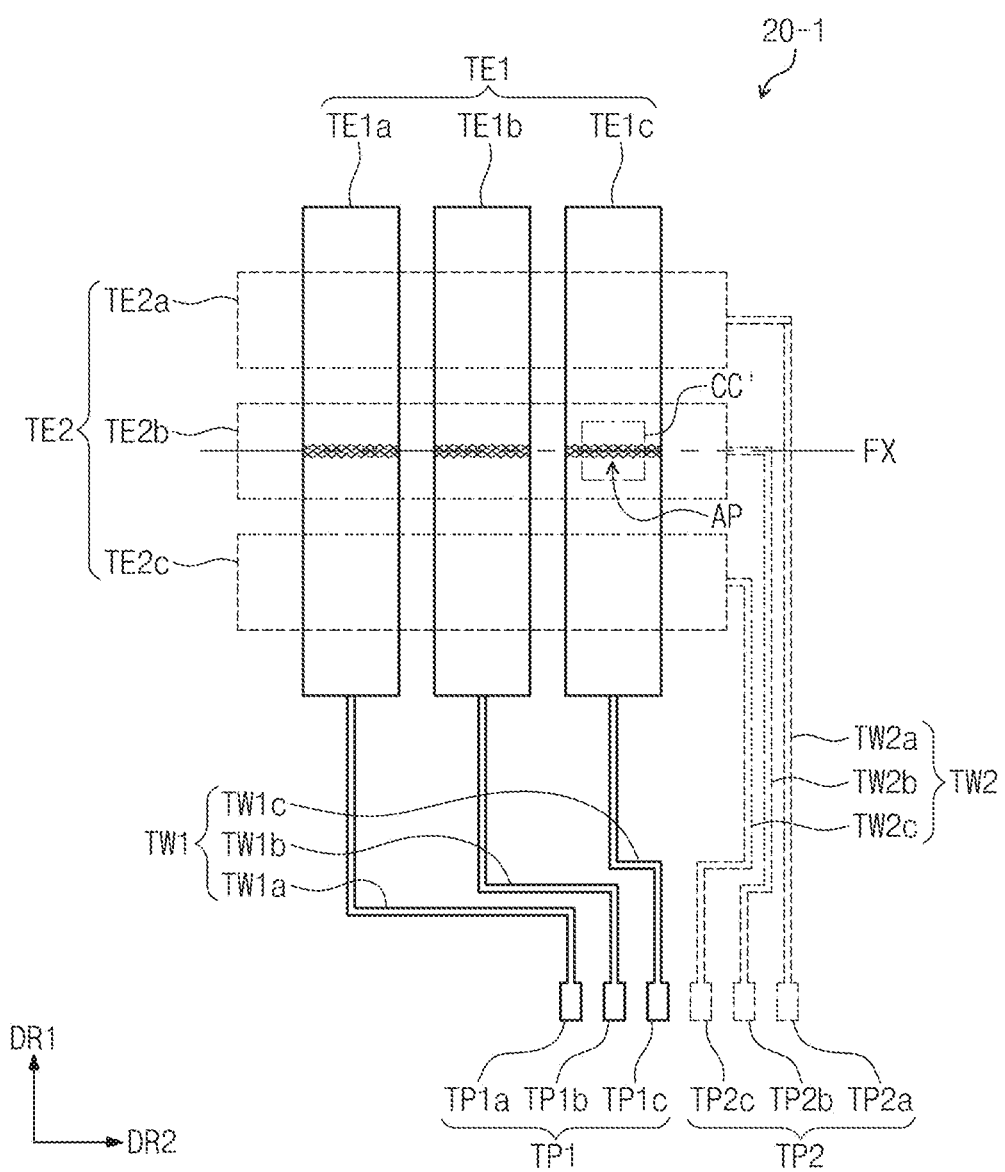
FIG. 6A is a plan view of a touch member, according to one or more exemplary embodiments.
Figure 6B:
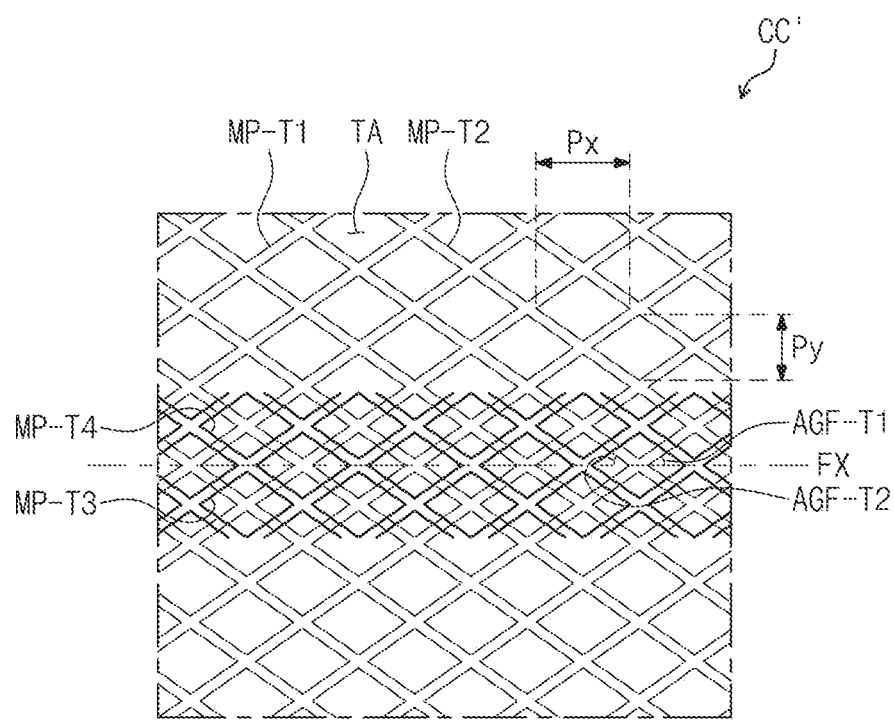
FIG. 6B is an enlarged plan of portion CC' of FIG. 6A, according to one or more embodiments.

FIG. 6A is a plan view of a touch member, according to one or more exemplary embodiments. FIG. 6B is an enlarged plan view of portion CC' of FIG. 6A. The touch member of FIGS. 6A and 6B is similar to the touch member in FIGS. 4, 5A, and 5B, and, as such, duplicative descriptions are omitted to avoid obscuring exemplary embodiments described herein.

Referring to FIG. 6A, the touch member 20-1 may further include an adding part AP. The adding part AP overlaps the folding axis FX. The adding part AP covers at least a portion of the folding area FA and extends adjacent to the folding area FA of a plane area, e.g., first plane area PA1. The adding part AP forms portions of first touch electrodes TE1a, TE1b, and TE1c. The adding part AP may be further disposed on portions overlapping the folding axis FX among the second touch electrodes TE2a, TE2b, and TE2c, the first lines TW1a, TW1b, and TW1c, and the second lines TW2a, TW2b, and TW3c, but exemplary embodiments are not limited thereto or thereby.

Referring to FIG. 6B, the adding part AP includes a plurality of third mesh lines MP-T3 and a plurality of fourth mesh lines MP-T4 crossing the third mesh lines MP-T3. The third mesh lines MP-T3 and the fourth mesh lines MP-T4 are disposed above the first mesh lines MP-T1 and the second mesh lines MP-T2. The third mesh lines MP-T3 and the fourth mesh lines MP-T4 are additionally formed on the first mesh lines MPT1 and the second mesh lines MP-T2. In this manner, the first mesh lines MP-T1, the second mesh lines MP-T2, the third mesh lines MP-T3, and the fourth mesh lines MP-T4 are electrically connected to each other. To this end, the third mesh lines MP-T3 are substantially parallel to the first mesh lines MP-T1. The fourth mesh lines MP-T4 are substantially parallel to the second mesh lines MP-T2. The third mesh lines MP-T3 and the fourth mesh lines MP-T4 may be formed using the same mask as the first mesh lines MP-T1 and the second mesh lines MP-T2.

According to one or more exemplary embodiments, the adding part AP improves a density of the conductive portion of the area overlapping the folding axis FX. As such, the strength of the conductive portion may be improved and influences exerted on the variation in resistance of the touch member may be reduced even though the conductive portion is partially opened via the transmission areas TA. To this end, since the touch member 20-1 further includes the adding part AP, reliability of the touch member 20-1 may be improved, and, as such, a display device including the touch member 20-1 may have stable electrical performance regardless of the number of times the display device is folded.

Figure 7A:
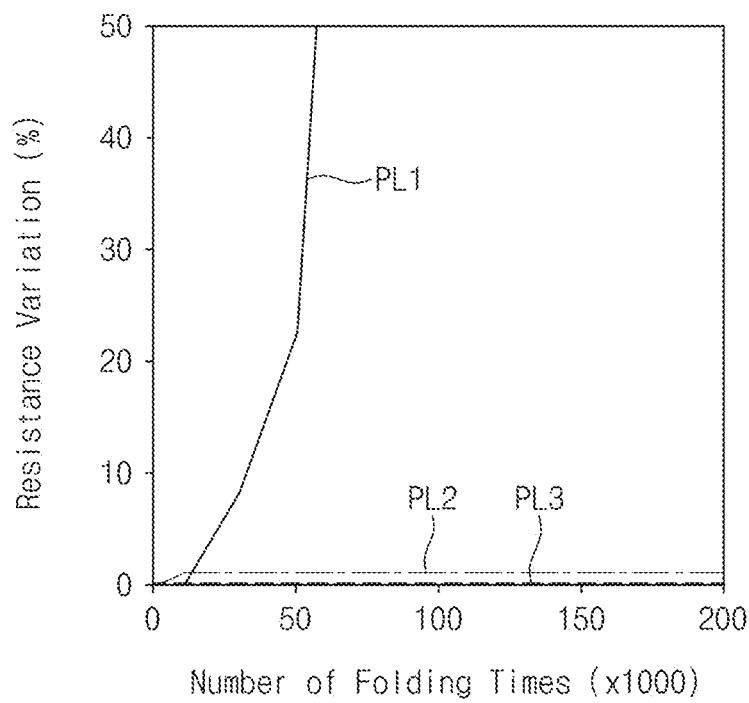
FIGS. 7A and 7B are graphs demonstrating a variation in resistance of a touch member as a function of the number of times the touch member is folded, according to one or more exemplary embodiments.
Figure 7B:
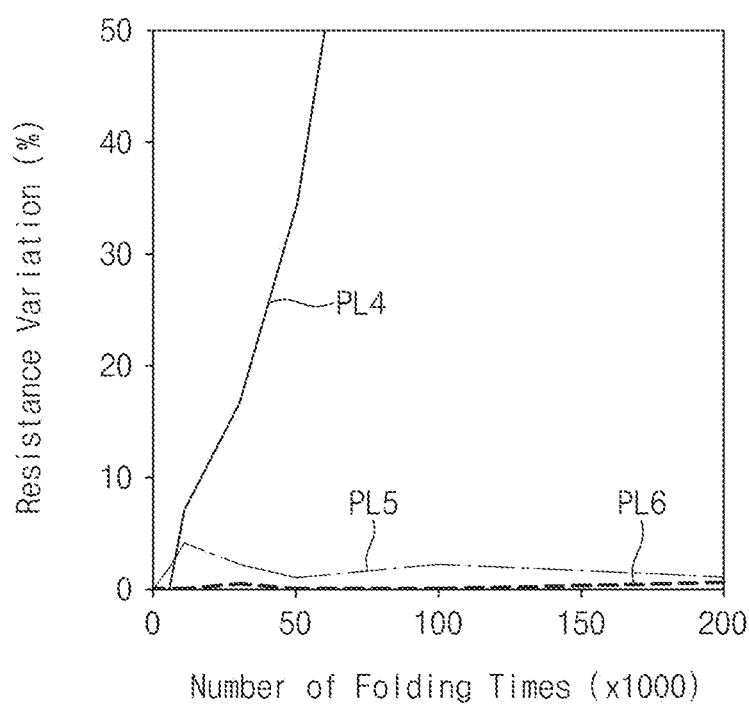

FIGS. 7A and 7B are graphs demonstrating a variation in resistance of a touch member as a function of the number of times the touch member is folded, according to one or more exemplary embodiments. FIG. 7A shows the resistance variation of the touch member manipulated into the inwardly folded state, whereas FIG. 7B shows the resistance variation of the touch member manipulated into the outwardly folded state.

It is noted that the resistance variations shown in FIGS. 7A and 7B were measured with respect to a touch electrode including the mesh lines. The mesh lines may be easily opened (or damaged) due to the folding stress. Although any one of the mesh lines is opened, the electrical signal may be transmitted through other ones of the mesh lines because the mesh lines are electrically connected to each other. However, when the number of opened mesh lines increases, the number of paths through which the electrical signal is transmitted is reduced. As such, the resistance of the touch member will increase with increasing opened paths in the mesh lines. To this end, the variation in resistance may increase as the mesh lines are damaged, and the electrical performance may be deteriorated as the resistance variation increases. The variation in electrical performance of the touch member, which may be caused, at least in part, by the folding of the touch member, will be described with reference to FIGS. 7A and 7B.

FIG. 7A shows a comparison example PL1 related to mesh lines forming the minimum angle of 90 degrees with respect to the folding axis, a first embodiment example PL2 related to mesh lines forming the minimum angle of about 40 degrees with respect to the folding axis, and a second embodiment example PL3 related to mesh lines forming the minimum angle of about 30 degrees with respect to the folding axis.

As previously described, stress caused by folding a display device is strongest in the direction substantially perpendicular to the folding axis and becomes weaker as the direction becomes more parallel to the folding axis. As seen in FIG. 7A, the resistance variation in the comparison example PL1 increases rapidly even though the number of times the display device is folded is relatively small. Different from the comparison example PL1, there is almost no variation in the resistance in the first exemplary embodiment example PL2 and the second exemplary embodiment example PL3 even though the number of times the display device is folded increases. Namely, the resistance variation is about 5% or less. As such, the first exemplary embodiment example PL2 and the second exemplary embodiment example PL3 including the mesh lines forming the minimum angle less than 90 degrees with respect to the folding axis are substantially not influenced due to the folding action.

Similar to the comparison example PL1, as shown in FIG. 7B, the resistance variation in a comparison example PL4 associated with the outwardly folded state tends to significantly increase when the number of times the display device is folded increases. The resistance variation in a first exemplary embodiment example PL5 associated with the outwardly folded state and in a second exemplary embodiment example PL6 associated with the outwardly folded state are uniformly represented even though the number of folding times increases.

Referring to FIGS. 7A and 7B, the resistance variation in the first exemplary embodiment examples PL2 and PL5 including the mesh lines forming a minimum angle of about 40 degrees with respect to the folding axis FX is irregularly represented in association with the outwardly folded state as compared to the inwardly folded state. In other words, the plot line associated with the first exemplary embodiment example PL2 in FIG. 7A is substantially linear, whereas the plot line associated with the first exemplary embodiment example PL5 in FIG. 7B is not as linear as in FIG. 7A.

As described with reference to FIGS. 3A to 3C, since the touch member 20 is farthest away from the folding axis FX when deformed in the outwardly folded state, a relatively larger stress deformation occurs in association with the outwardly folded state as compared to the inwardly folded state. The first exemplary embodiment examples PL2 and PL5 including the mesh lines forming a minimum angle of about 40 degrees with respect to the folding axis are damaged in different degrees in accordance with the folding state even though the minimum angle is constant.

Dissimilarly, there is almost no difference in resistance variation in the second exemplary embodiment examples PL3 and PL6 including the mesh lines forming a minimum angle less than about 30 degrees with respect to the folding axis FX. Accordingly, when the touch member 20 includes the mesh lines forming a minimum angle less than about 30 degrees with respect to the folding axis FX, the electrical performance of the touch member 20 may be stably maintained despite the folding stress and regardless of the folding direction.

Figure 8A:
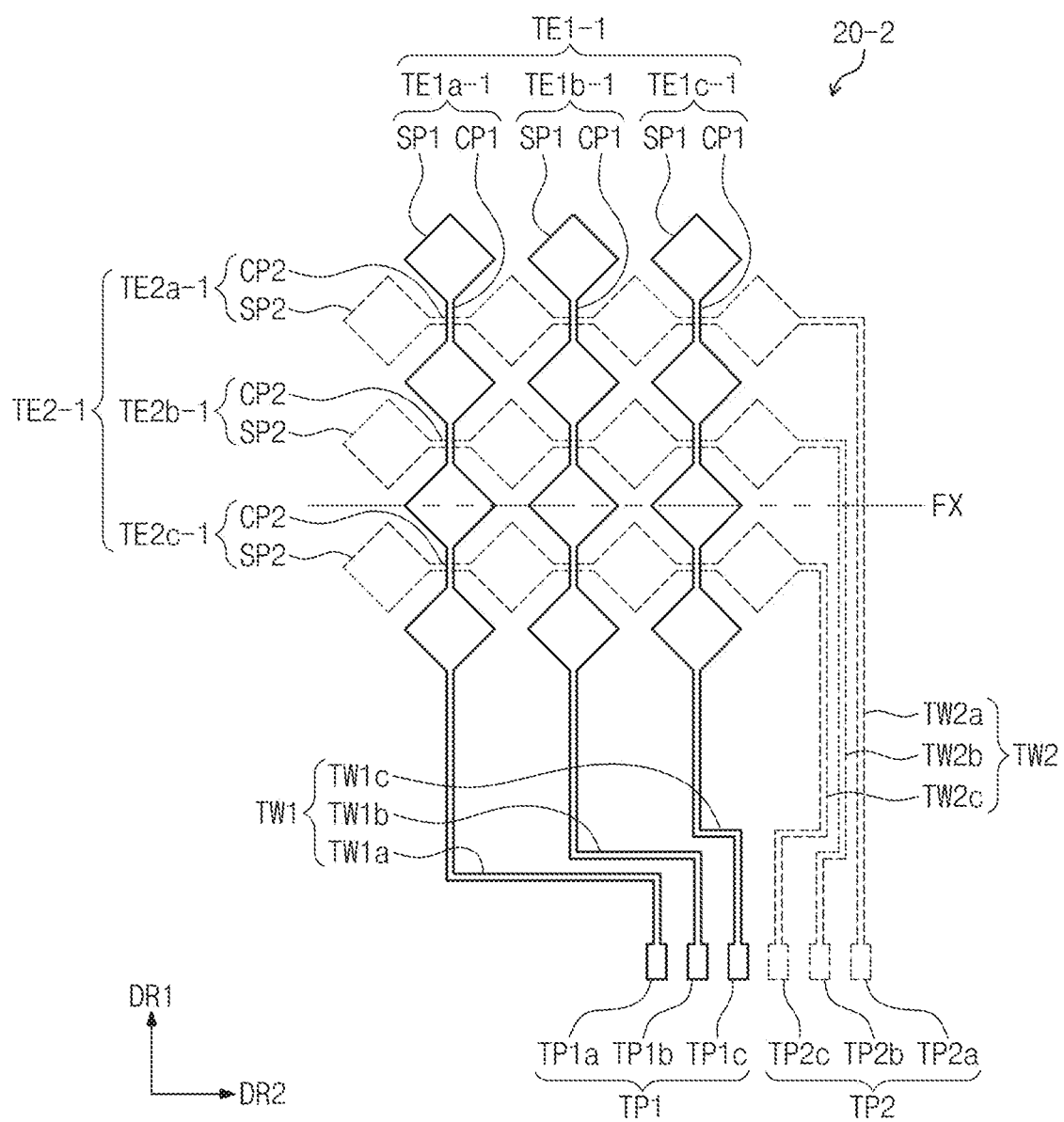
FIGS. 8A and 8B are plan views of touch members, according to various exemplary embodiments.
Figure 8B:
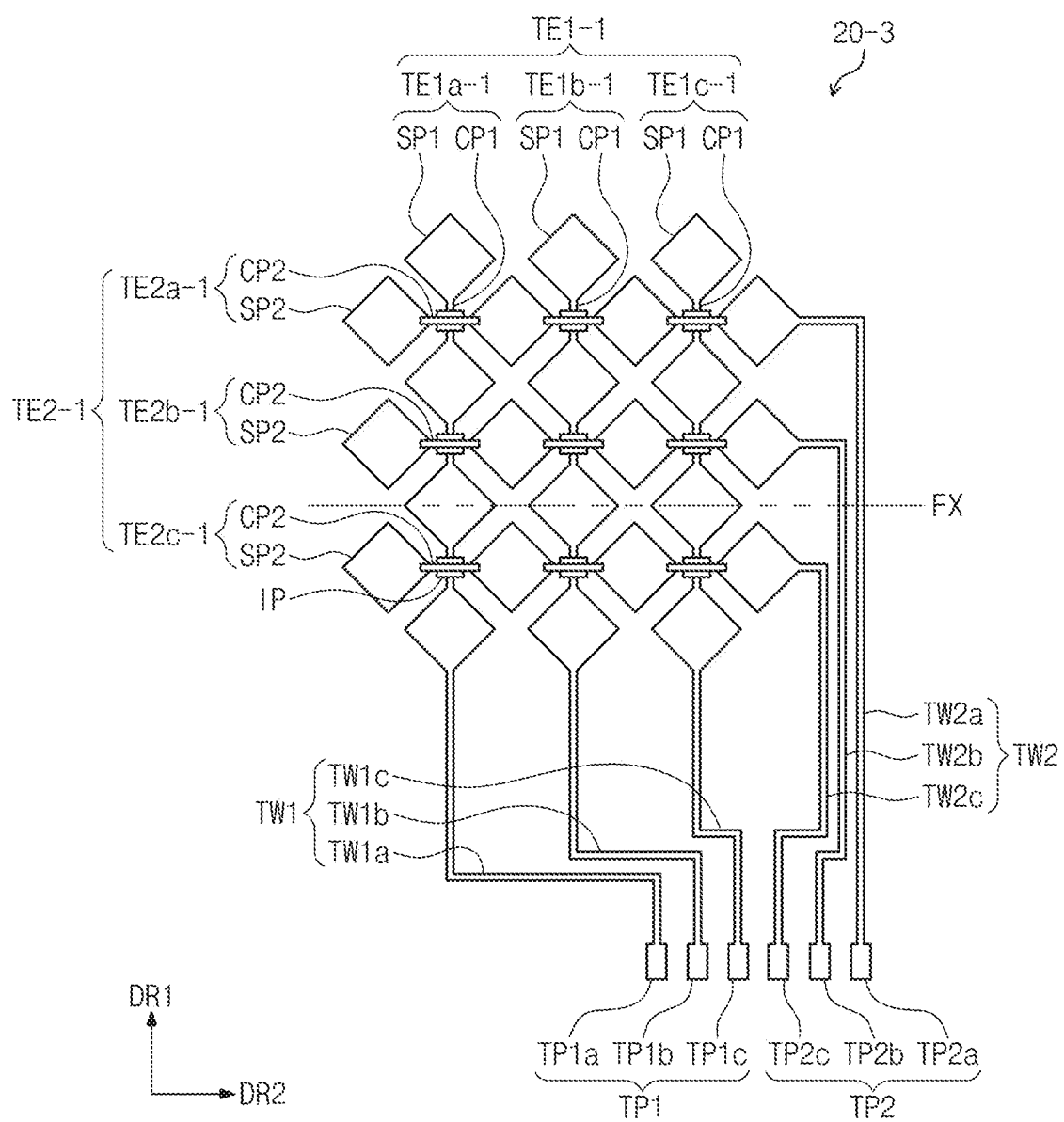

FIGS. 8A and 8B are plan views of touch members, according to various exemplary embodiments. The touch members in FIGS. 8A and 8B are similar to the touch members in FIGS. 4 and 6A, however, to avoid obscuring exemplary embodiments described herein, primarily differences are described below and duplicative descriptions will be omitted.

Referring to FIG. 8A, a first electrode TE1-1 and a second electrode TE2-1 forming the touch sensor may be disposed on different layers from each other with an insulating layer disposed between the first electrode TE1-1 and the second electrode TE2-1. Each of first touch electrodes TE1a-1, TE1b-1, and TE1c-1 forming the first electrode TE1-1 includes a plurality of first sensing parts SP1 and a plurality of first connection parts CP1. The first sensing parts SP1 are arranged in the first direction DR1. Each of the first connection parts CP1 extends in the first direction DR1 to connect adjacent sensing parts SP1 to each other among the first sensing parts SP1. Each of second touch electrodes TE2a-1, TE2b-1, and TE2c-1 forming the second electrode TE2-1 includes a plurality of second sensing parts SP2 and a plurality of second connection parts CP2. The second sensing parts SP2 are arranged in the second direction DR2. Each of the second connection parts CP2 crosses a corresponding first connection part CP1 of the first connection parts CP1. Each of the second connection parts CP2 extends in the second direction DR2 to connect adjacent second sensing parts SP2 to each other among the second sensing parts SP2.

Furthermore, as seen in FIG. 8A, the folding axis FX may cross over sensing parts (e.g., the first sensing parts SP1) of the touch electrodes (e.g., the first touch electrodes TE1a-1, TE1b-1, and TE1c-1). In this manner, folding stress generated when folding the touch member 20-2 along the folding axis FX may be distributed over a greater number of mesh lines than if the folding axis FX crossed over connecting parts (e.g., the first connecting parts CP1). Although not illustrated, the first sensing parts SP1 overlapping the folding axis FX may include the adding parts AP of FIG. 6A.

Referring to FIG. 8B, a first electrode TE1-1 and a second electrode TE2-1 forming the touch sensor may be disposed on the same layer. For instance, the second sensing parts SP2 may be disposed on the same layer as the first sensing parts SP1 and may be spaced apart from the first sensing parts SP1. In this manner, a touch member 20-3 may further include a plurality of insulating patterns IP to insulate the first connection parts CP1 from the second connection parts CP2. The insulating patterns IP may be disposed on the same layer as the first sensing parts SP1 and the second sensing parts SP2 and may overlap the first connection parts CP1. To this end, the second connection parts CP2 may be disposed on the insulating patterns IP and electrically insulated from the first connection parts CP1. The second connection parts CP2 extend outward more than the insulating patterns IP to connect adjacent second sensing parts SP2 together. Although not shown, the second connection parts CP2 may be connected to the second sensing parts SP2 after penetrating through the insulating patterns IP, e.g., through a via or connecting hole formed through the insulating patterns IP.

As with the touch member 20-2 of FIG. 8A, the folding axis FX associated with the touch member 20-3 may cross over sensing parts (e.g., the first sensing parts SP1) of the touch electrodes (e.g., the first touch electrodes TE1a-1, TE1b-1, and TE1c-1). In this manner, folding stress generated when folding the touch member 20-3 along the folding axis FX may be distributed over a greater number of mesh lines than if the folding axis FX crossed over connecting parts (e.g., the first connecting parts CP1). Further, although not illustrated, the first sensing parts SP1 overlapping the folding axis FX may include the adding parts AP of FIG. 6A.

Figure 9A:
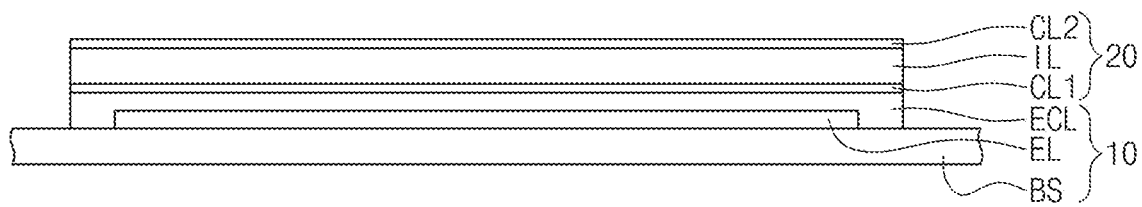
FIGS. 9A and 9B are cross-sectional views of display devices, according to various exemplary embodiments.
Figure 9B:
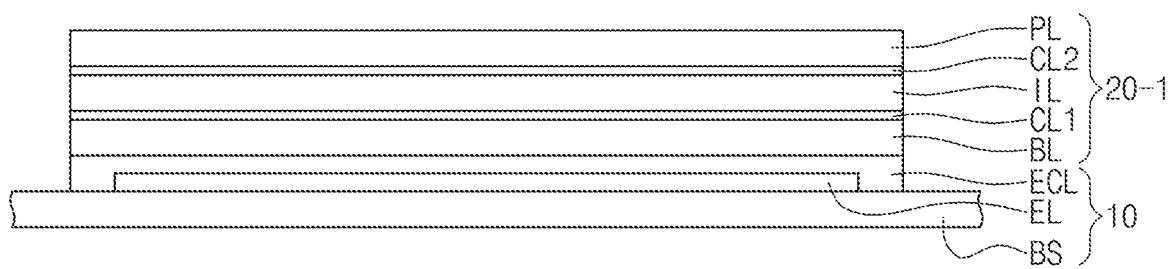

FIGS. 9A and 9B are cross-sectional views of display devices, according to various exemplary embodiments. Hereinafter, different layer structures of display devices will be described with reference to FIGS. 9A and 9B.

Referring to FIGS. 9A and 9B, the display member 10 may include a base layer BS, an element layer E1, and an encapsulation layer ECL. The base layer BS may be formed of any suitable material, such as, for example, various plastic layers having flexibility. For instance, the base layer BS may be formed of polyethylene terephthalate (PET), polyethylene naphthalate (PEN), polycarbonate (PC), polyethersulfone (PES), polyarylate (PAR), polysulfone (PSF), cyclic-olefin copolymer (COC), polyimide (PI), PI-fluoroalkyl (fluoro) based polymer compound, polyetherimide (PEI), epoxy resin, etc.

The element layer EL is disposed on the base layer BS. As previously described, the display device may include an organic light emitting display panel as the display member 10. In this manner, the element layer EL may include the organic light emitting diode OLED, the thin film transistors TFT1 and TFT2, and the capacitor Cap of FIG. 2. The encapsulation layer ECL is disposed on the base layer BS to cover the element layer EL. The encapsulating layer ECL may protect the element layer EL from moisture, oxygen, debris, contaminants, etc. The encapsulation layer ECL may include a transparent insulating material. For instance, the encapsulation layer ECL may include at least one of an organic and inorganic material. To this end, the encapsulation layer ECL may have a single or multi-layer structure. Furthermore, the encapsulation layer ECL may have a thickness of about 1 micrometer to about 10 micrometers. In this manner, the display member 10 may be encapsulated by the encapsulation layer ECL, and, as such, the display device may be sufficiently protected, yet slim.

Although not shown, the encapsulation layer ECL may have substantially the same thickness as that of the base layer BS. In this manner, a sealing member may be further disposed between the encapsulation layer ECL and the base layer BS to support the encapsulation layer ECL. It is contemplated, however, that any suitable structure of the encapsulation layer ECL may be utilized in association with exemplary embodiment described herein.

As shown in FIG. 9A, the touch member 20 includes a first conductive layer CL1, an insulating layer IL, and a second conductive layer CL2. Referring to FIG. 4, the first conductive layer CL1 includes the second electrode TE2, the second line TW2, and the second pad TP2, and the second conductive layer CL2 includes the first electrode TE1, the first line TW1, and the first pad TP1. In this manner, the touch sensor including the first conductive layer CL1 and the second conductive layer CL2 may be directly disposed on the encapsulation layer ECL. The first conductive layer CL1 may contact an upper surface of the encapsulation layer ECL. The touch sensor may be disposed directly on the encapsulation layer ECL, and, as such, the display device may be slimmed down.

As shown in FIG. 9B, the touch member 20-1 may further include a base layer BL. The base layer BL may be formed of any suitable material, such as, for example, various plastic materials having flexibility. For instance, the base layer BL may include the same material as that of the base layer BS. Although not shown, an adhesive layer may be further disposed between the base layer BL and the encapsulation layer ECL. In this manner, the display device may be manufactured by separately forming the touch member 20-1 and the display member 10 and later disposing the touch member 20-1 on the display member 10.

According to one or more exemplary embodiments, because the touch member 20-1 further includes the base layer BL, reliability of the touch member 20-1 may be improved. In addition, given that the touch member 20-1 and the display member 10 are formed through independent processes, a yield of the display device may be improved. Further, the display device may include a protection layer PL to further protect the touch member 20-1 from external impacts, debris, contaminants, etc. The protection layer PL may be formed of any suitable material, such as one or more organic and/or inorganic materials.

Although certain exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A The display device comprising:
   a display member configured to generate an image, the display member being, in a plan view, divided into:
      a folding area configured to be folded along a folding axis; and
      a plan area adjacent to the folding area; and
   a touch member configured to detect a touch interaction associated with the display member, the touch member comprising:
      a touch sensor comprising:
         a first touch electrode extending in a first direction; and
         a second touch electrode insulated from the first touch electrode, the second touch electrode extending in a second direction crossing the first direction; and
      a signal line electrically connected to the touch sensor,
   wherein:
      each of the first touch electrode and the second touch electrode comprises a plurality of mesh lines integrally formed with each other in at least the folding area to form a sensing portion of each of the first and second touch electrodes in a mesh-shape, the plurality of mesh lines extending in directions different from the first direction and the second direction;
      at least some of the plurality of mesh lines overlap the folding axis in a plan view; and
      a minimum angle between the folding axis and each of the directions of the mesh lines overlapping the folding axis is less than 90 degrees,
   wherein:
      the touch sensor comprises a plurality of touch electrodes, the first touch electrode being one of the plurality of touch electrodes;

each of the plurality of touch electrodes comprises:
first mesh lines of the plurality of mesh lines, the first mesh lines extending in a third direction different from the first direction and the second direction; and
second mesh lines of the plurality of mesh lines, the second mesh lines extending in a fourth direction crossing the third direction and being different from the first direction, the second direction, and the third direction; and
the first mesh lines and the second mesh lines define transmission parts,
wherein one of the plurality of touch electrodes overlapping the folding area further comprises:
third mesh lines overlapping the folding area, the third mesh lines being disposed on the first mesh lines and the second mesh lines; and
fourth mesh lines crossing the third mesh lines in the folding area, the fourth mesh lines being disposed on the first mesh lines and the second mesh lines, the fourth mesh lines crossing the third mesh lines, and
wherein the first mesh lines, the second mesh lines, the third mesh lines, and the fourth mesh lines are electrically connected to one another.

2. The display device of claim 1, wherein a width of each of plurality of mesh lines is greater than or equal to about 10 micrometers and less than or equal to about 3000 micrometers.

3. The display device of claim 2, wherein:
the plurality of mesh lines define transmission parts; and
each transmission part of the transmission parts is a polygonal shape in a plan view.

4. The display device of claim 3, wherein, in a plan view, different transmission parts of the transmission parts comprise different polygonal shapes from one another.

5. The display device of claim 3, wherein, in a plan view, polygonal shapes of the transmission parts are equivalent to one another.

6. The display device of claim 1, wherein each of the transmission parts is lozenge shaped.

7. The display device of claim 6, wherein:
a first transmission part of the transmission parts overlaps the folding area; and
a lozenge shape of the first transmission part comprises:
a first diagonal line substantially parallel to the folding axis; and
a second diagonal line crossing the first diagonal line.

8. The display device of claim 7, wherein length of the first diagonal line is longer than length of the second diagonal line.

9. The display device of claim 8, wherein, in a folded state, the touch member is configured to apply a compressive stress in the folding area.

10. The display device of claim 8, wherein, in a folded state, the touch member is configured to apply a tensile stress in the folding area.

11. The display device of claim 8, wherein the length of the first diagonal line is greater than or equal to about 10 micrometers and less than or equal to about 500 micrometers.

12. The display device of claim 1, wherein:
each of the third mesh lines is substantially parallel to each of the first mesh lines; and
each of the fourth mesh lines is substantially parallel to each of the second mesh lines.

13. The display device of claim 1, wherein:
the signal line comprises a plurality of conductive lines;
the plurality of conductive lines define a mesh shape; and
arrangements of the plurality of conductive lines and the plurality of mesh lines are equivalent to one another.

14. The display device of claim 1, wherein:
the first touch electrode is one of a plurality of first touch electrodes;
the second touch electrode is one of a plurality of second touch electrodes;
the first touch electrodes extend in the first direction and are arranged in the second direction crossing the first direction; and
the second touch electrodes extend in the second direction and are arranged in the first direction.

15. The display device of claim 14, wherein the folding axis extends in a direction substantially parallel to the first direction or the second direction.

16. The display device of claim 14, wherein:
the first touch electrode comprises:
first sensing parts arranged in the first direction; and
first connection parts disposed between and connecting adjacent first sensing parts of the first sensing parts; and
the second touch electrode comprises:
second sensing parts arranged in the second direction; and
second connection parts disposed between and connecting adjacent second sensing parts of the second sensing parts;
each of the first sensing parts and the first connecting parts respectively comprises some of the plurality of mesh lines of the first touch electrode; and
each of the second sensing parts and the second connecting parts respectively comprises some of the plurality of mesh lines of the second touch electrode.

17. The display device of claim 16, wherein:
an insulating layer is disposed between the first sensing parts and the second sensing parts; and
the insulating layer is disposed between the first connection parts and the second connecting parts.

18. The display device of claim 16, wherein:
a layer of the touch sensor comprises the second sensing parts and the first sensing parts; and
the second sensing parts are, in a plan view, spaced apart from the first sensing parts.

19. The display device of claim 1, wherein the display member comprises:
a base layer; and
an element layer disposed on the base layer, the element layer comprising an organic light emitting diode.

20. The display device of claim 19, wherein:
the display member comprises an encapsulation layer covering the element layer; and
the touch sensor is disposed on the encapsulation layer.

* * * * *